United States Patent [19]
Bailey

[11] 3,736,744
[45] June 5, 1973

[54] PROPELLANTS FROM EARTH'S HEATS

[76] Inventor: Wayne Bailey, Schaghticoke Hill, Schaghticoke, N.Y. 12154

[22] Filed: Oct. 13, 1970

[21] Appl. No.: 80,331

[52] U.S. Cl. ............................................. 60/6, 60/26
[51] Int. Cl. .......................... F03g 7/00, F01d 13/00
[58] Field of Search ............................... 60/26, 55, 6

[56] References Cited

UNITED STATES PATENTS

| | | | |
|---|---|---|---|
| 2,801,069 | 7/1957 | Campbell | 60/55 X |
| 3,140,986 | 7/1964 | Hubbard | 60/26 X |
| 3,274,769 | 9/1966 | Reynolds | 60/26 |
| 3,470,943 | 10/1969 | Van Huisen | 60/26 X |

FOREIGN PATENTS OR APPLICATIONS

| | | | |
|---|---|---|---|
| 498,700 | 5/1930 | Germany | 60/26 |

OTHER PUBLICATIONS

Scientific American; Volume CXVII, No. 17, pages 305–306; Oct. 27, 1917.
Scientific American; "Power From the Earth" By Albert Ingalls; Nov. 1929, pgs. 422–424.
The Evening Star (Washington, D.C.) Feb. 19, 1971, page D-12, "Heat from the Earth."

Primary Examiner—Martin P. Schwadron
Assistant Examiner—Allen M. Ostrager
Attorney—Robert Kemp

[57] ABSTRACT

A power plant apparatus combination including a first hydroelectric prime mover positioned deep in the earth furnishing water and electricity to a steam boiler supplying steam to a second prime mover through a heat insulated steam pipe; the second prime mover is also equipped to generate electric current. Excess water run-off means is provided and units for recovering fresh water and sea salt when these are desired can also be provided.

10 Claims, 2 Drawing Figures

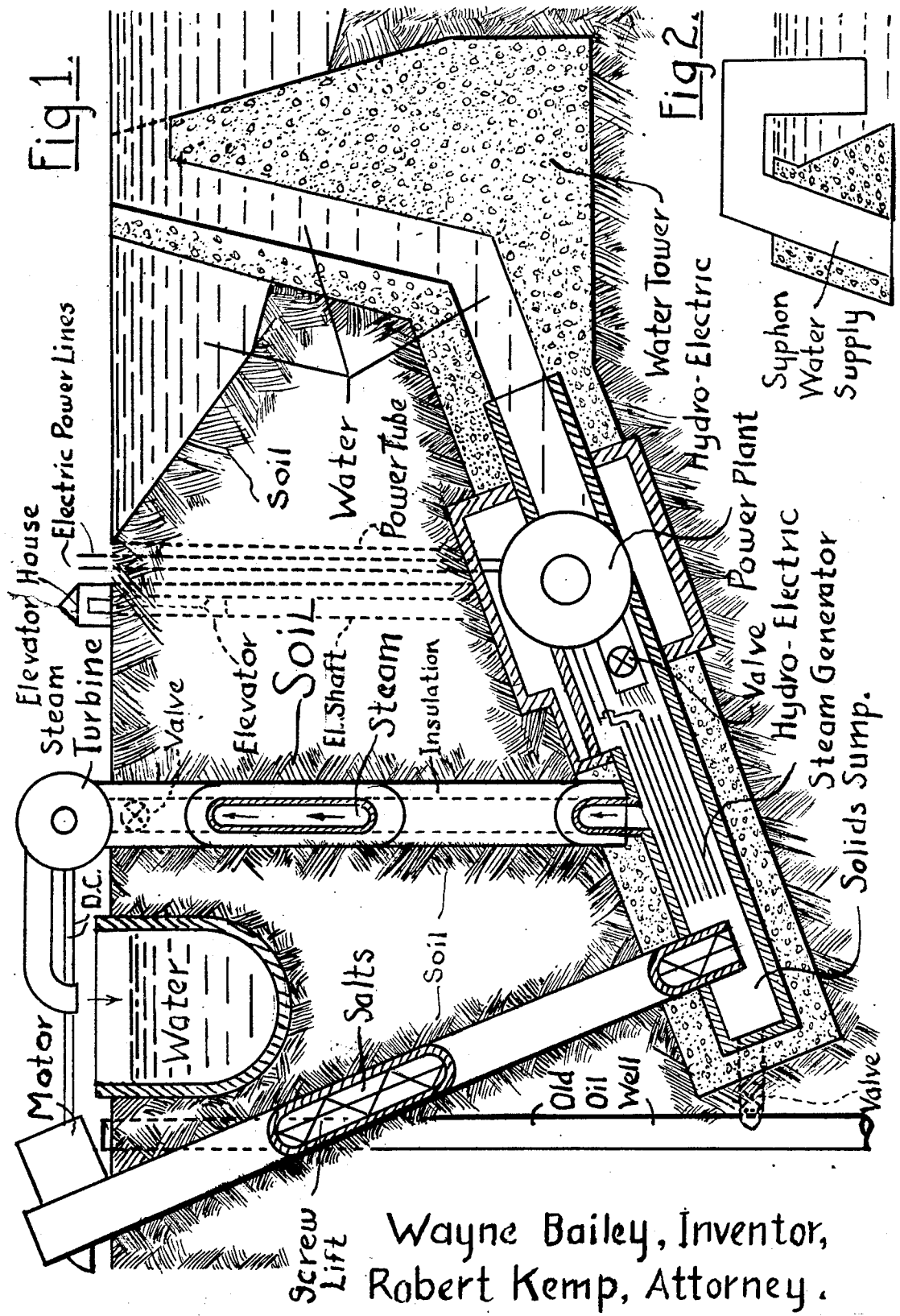

PROPELLANTS FROM EARTH'S HEATS

Modern vehicles are propelled largely by the burning of so-called fossil fuels. This also may be said of fixed stationary power plants operating across this earth's surface to furnish electric power to people. There is much unwanted pollution of air and water by reason of these same present methods of widespread power (portable and fixed) production, distribution and use. Since these same fossil fuels, (coal, oil and natural gas), have important uses in the chemical plastics and other fields, their prodigious waste by being irreplaceably burned in being increasingly objected to by the industries that need them as raw materials. In fact, the concerns producing coal, oil and gas are making more money from these same fossil fuels changing them into chemicals, plastics, artificial rubber, etc., (per unit of weight or bulk) than they are by selling them, (the fossil fuels), to be irreplaceably burned in movable or fixed power plants. So the concerns producing coal, oil and natural gas are always willing and ready to consider the use and the sale of power plant fuels that are not of the fossil fuel kind.

To reach the underground areas where earth's heats flow continuously upward and where they are of power producing temperatures, requires new ways of reaching these depths, establishing power plant and heat pick-up assemblages at these deep places, that for the most part are continuous and also continuously remotely controlled, but that can be installed and put into operation by people, and when needed can be successfully reached by human beings even though they are located far below this earth's ground level surface.

In the drawing made a part hereof, I show the general nature of plants adapted to recover earth's heats continuously. In this drawing we have a land mass, indicated by the word "Soil". Adjacent to this soil I show a source of water, in this instance, salt water. A concrete so-called "water tower" guides water through a tubular passage to a hydro-electric generating plant considerably below the water level or the ground level. The water leaving the hydro-electric power plant goes through a series of electrically heated plates, designated as a hydro-electric steam generator. The steam generated on these electrically heated plates rises through a heat insulated steam pipe to a steam turbine operating on or slightly above ground level. The fresh water condensate from the upper steam turbine goes to a collecting tank. Means are shown on the drawing for continually lifting salts that collect in a sump after the water from the lower water turbine, (or hydro electric power plant), has been evaporated electrically. This screw lift is here shown as actuated by a motor above ground. Since a certain amount of liquid may be collected in the sump, (indicated here as the "solids sump"), and since this liquid will have to be continually disposed of, I have illustrated how this disposal is achieved by means of a pipe connecting the solids sump to an old oil well pipe, the liquid seeping through a short pipe connection from, (or between), the solids sump and the old oil well casing. When X's are enclosed within O's these indicate control valves across the drawing. The upper steam turbine power generator drives an electrical generator on the far side of it, whose electric power lines are shown issuing to the left of the upper steam turbine. A passenger elevator is indicated capable of taking people from the ground level to the lower hydroelectric station. How this elevator can be operated in relays and how the cars of the elevator can be provided with telephone communication to the surface or to the lower hydroelectric power plants will later be herein described. Means are shown for bringing the electric current generated in the water power plant under ground, bringing this electric current to the surface, (or ground level). All these above items are clearly shown in FIG. 1.

In FIG. 2, I show the arrangement of a syphon positioned near the shore of a water body sufficient in volume to supply the underground hydroelectric power plant with the water it needs to do the work it has to do. Once this syphon starts functioning it merely continues to deliver a steady supply of water to the mechanisms underground for making electricity and using this electric current for the various operations as they are here illustrated.

Again in connection with FIG. 1, it will be noted that the motor driving the screw lift is operated by the electric current coming from the generator, (electric generator), not shown, that in turn is being driven by the above ground level steam turbine.

Those teaching geology generally adhere to the figure of 1° Fahrenheit for every 60 feet downward, as the average temperature increase to be expected, when penetrating the Earth's cool crust. This comes to a temperature increase of 88° Fahrenheit per mile, (each 5,280 feet).

At two miles down we can look for 175°F as the crustal temperature, and at a total of 12,720 foot depth there should be 212° Fahrenheit, the temperature of boiling water (or the production of steam).

Many previous oil wells, now dry, have reached depths lower than 13,000 feet, and undoubtedly wells have been drilled to this same depth, or lower, that never yielded any oil in the first place. So the question is, how to get these open holes (lined with a 6 inch diameter steel pipe) to yield a steady supply of steam for steam turbines operating at the Earth's surface.

One answer is to supply these same depths with a steady supply of water, which, if it is salt water, will yield a continuous supply of salts, along with a steady supply of steam for the production of power and also the production of fresh water for human or chemical process uses.

When my operations are located near a volcano, that in turn is positioned near fresh or salt water supply, it is not necessary to go to these above depths to find a continuous supply of earth heat, or a corresponding supply to fresh water condensate, (issuing from steam turbines), or an equally continuous supply of sea salts from which other chemicals can be extracted.

If such a power recovery is located in the arctic or on the continent of Antarctica, the extremely cold atmospheres in those remote regions can furnish the cold needed for steam vapor condensation, (as this steam issues from a power producing steam turbine). In that case, I propose to syphon my water from its source, and then slide it downward to the hotter regions below, where it will be heated, either naturally or artificially to produce steam for later power or fresh water production, on this Earth's surface.

It is well known that many oil supplies start from so-called salt domes, thousands of feet below the surface of the Earth's crust. These salt domes are filled with oil and often with large supplies of natural gas as well. When the salt dome has been drained of its oil and natural gas, it remains as an empty chamber with walls that are hot and a floor that too is at an elevated temperature. The walls and the floor continue to receive their heat, (and high temperature), from the heat that continues to flow upward from down below. Geologists assume that from the lower white hot liquid rock plastic base of the Earth's crust to the Earth's surface is approximately 20 or 25 miles, depending upon whether the ocean or the land is forming the Earth's crust at that point.

Since the average diameter of the planet is conceded to be about 8,000 miles, (from sea level to sea level), with the exception of the so-called "cool crust", the rest of this globe is to be regarded as being white hot and liquid rock, (or mantle), with an equally white hot core of metal at the Earth's center. The natural force which keeps this all together in one round ball, is the force of gravity coming in toward us from outer space. Geologists are now beginning to learn what keeps this white hot liquid rock and metal ball, continuously white hot and liquid.

The liquid nature of the Earth is continuously demonstrated by the volcanic lava that pours forth from this planet's volcanos.

While these volcanos, or many of them, are apt to erupt almost without notice at any time, this does not preclude the real possibility of turning their heat into useful mechanical or electrical energy, that can there be used for electrolytic gas production, and the liquifaction of these same electrolytic gases for use at some more remote point. To liquify the hydrogen and oxygen obtained by the electrolysis of water, is to make it more easy to transport in heat excluding containers to the places where it or where they are to be used.

There are eight volcanos in the United States that are due to erupt almost at any time. To live near these volcanos, is to place oneself, (or one's family), in constant jeapordy of sudden death Yet to place steam power plants near them, and operate these power plants by remote control, is well within the purview of my present inventive concept.

Over the past four hundred years the needless waste of our precious fossil fuels has been prodigious. Coal, oil and gas resources have gotten into the hands of a few reactionary families who have brushed aside all study of the full possibilities of continuous fueless energy, and the ways it can be obtained. But it is to these ends that my inventive concepts are herein set forth. To continue to burn vast tonnages of fossil fuels every day is entirely unnecessary.

I claim:

1. In an underground power producing power plant, a source of water at or near the surface of the earth, a conduit attached to a water turbine positioned deep down in the earth capable of leading a continuous flow of water from said water source to said deeply positioned water turbine, said conduit being heated by the natural up-coming heat of the earth, an electric generator attached to and actuated by said deeply positioned water turbine, an electrically heated steam generator heated by electricity from said deeply positioned electric generator, a steam turbine connected by a heat insulated steam pipe to said electrically heated steam generator, an electrical generator rotatively connected to said steam turbine, a water outlet pipe connected to said water turbine and to said steam generator, for removing excess water therefrom, a steam condenser connected to said steam turbine for condensing the exhaust steam issuing from said steam turbine.

2. The power plant as set forth in claim 1 including an electrical power line for bringing the power made by the deeply positioned electrical generator to the surface of the earth.

3. The power plant as claimed in claim 1, including a water source that is a salt water source.

4. The power plant as claimed in claim 1, including means for removing salt from the outlet to said steam generator.

5. The power plant as claimed in claim 1, including electric drive means for lifting evaporated salt from an area adjacent to said electric generator driven by said deeply positioned water turbine.

6. The power plant as claimed in claim 1 including elevator means for getting down to said power plant water turbine and said electrical generator, from the earth's surface.

7. The power plant as claimed in claim 1, including syphon means for lifting water to be plunged to the said underground steam water turbine to gain additional water head at or near the surface of said water source.

8. The power plant as set forth in claim 1 including the positioning of the deep water turbine within a power room and human access to the apparatus located in said deep power room.

9. The power plant as set forth in claim 1, including a valve in said water outlet pipe.

10. A power plant as set forth in claim 1 including a rotating screw member bringing salt to the earth's surface from the lower end of said deep steam generator, screw means actuated by an electric motor.

* * * * *